(12) United States Patent
Venkataraman et al.

(10) Patent No.: US 10,691,421 B2
(45) Date of Patent: Jun. 23, 2020

(54) EMBEDDED DESIGNER FRAMEWORK AND EMBEDDED DESIGNER IMPLEMENTATION

(71) Applicant: Microsoft Technology Licensing, LLC, Redmond, WA (US)

(72) Inventors: Sankara Narayanan Venkataraman, Bellevue, WA (US); Gaurav Sachdeva, Bangalore (IN); Rohit Mitra, Bangalore (IN); Raghavendra Malleswara, Davangere (IN); Sunil Ajjampur Jagadeesh, Bangalore (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 281 days.

(21) Appl. No.: 15/621,910

(22) Filed: Jun. 13, 2017

(65) Prior Publication Data
US 2018/0357048 A1    Dec. 13, 2018

(51) Int. Cl.
| | | |
|---|---|---|
| *G06F 9/451* | (2018.01) | |
| *G06F 8/34* | (2018.01) | |
| *G06Q 10/10* | (2012.01) | |
| *G06F 8/36* | (2018.01) | |
| *G06F 8/20* | (2018.01) | |
| *G06F 3/048* | (2013.01) | |
| *G06F 16/958* | (2019.01) | |

(52) U.S. Cl.
CPC .............. *G06F 8/34* (2013.01); *G06F 3/048* (2013.01); *G06F 8/24* (2013.01); *G06F 8/36* (2013.01); *G06F 9/451* (2018.02); *G06F 16/958* (2019.01); *G06Q 10/10* (2013.01)

(58) Field of Classification Search
CPC . G06F 9/451; G06F 3/048; G06F 8/34; G06F 16/958; G06F 8/24; G06F 8/36; G06Q 10/10
See application file for complete search history.

(56) References Cited

U.S. PATENT DOCUMENTS

| | | |
|---|---|---|
| 7,921,023 B2 | 4/2011 | Theiss et al. |
| 8,156,470 B2 | 4/2012 | Krueger et al. |
| 8,510,682 B2 * | 8/2013 | Kusterer ............... G06F 3/0481 715/853 |
| 9,141,409 B2 | 9/2015 | Yonat |

(Continued)

OTHER PUBLICATIONS

USPTO, PE2E System, Version Sep. 2016 (Year: 2016).*

(Continued)

*Primary Examiner* — Mahelet Shiberou
(74) *Attorney, Agent, or Firm* — Mannava & Kang, P.C.

(57) ABSTRACT

In some examples, embedded designer implementation may include, upon receiving an indication of actuation of a second designer launch element that is included in a first designer, launching a second designer inline from the first designer. Further, embedded designer implementation may include, upon receiving an indication of actuation of a first designer return element that is included in the second designer, returning to the first designer inline from the second designer. The first designer and the second designer may include a configurable component. Further, embedded designer implementation may include utilizing a common portion of the memory for the configurable component.

18 Claims, 11 Drawing Sheets

(56) References Cited

U.S. PATENT DOCUMENTS

| | | | |
|---|---|---|---|
| 2005/0283800 A1* | 12/2005 | Ellis | H04N 5/44543 |
| | | | 725/40 |
| 2012/0260202 A1 | 10/2012 | Jiang et al. | |
| 2012/0317486 A1* | 12/2012 | Loew | G06F 16/958 |
| | | | 715/730 |
| 2016/0098250 A1* | 4/2016 | Gross | G06F 8/20 |
| | | | 717/109 |

OTHER PUBLICATIONS

USPTO, PE2E-OC Launch Official Correspondence (Year: 2016).*

"Customization concepts", https://technet.microsoft.com/en-us/library/dn531193.aspx, Published on: Nov. 28, 2016, 11 pages.

"Nucleus ReadyStart—Enablement Platform for Developers", https://web-beta.archive.org/web/20140401160329/http:/www.mentor.com:80/embedded-software/nucleus/readystart/, Published on: Apr. 1, 2014, 2 pages.

"Customizing Applications with MDS", https://docs.oracle.com/cd/E15586_01/web.1111/b31974/customize.htm, Published on: Aug. 11, 2013, 20 pages.

"Customizing the Applications for Functional Administrators", https://web-beta.archive.org/web/20150912193203/https:/docs.oracle.com/cloud/latest/common/OAEXT/OAEXT1184587.htm, Published on: Sep. 12, 2015, 39 pages.

"How to: Pass Values between Asp.net Web Forms Pages", https://msdn.microsoft.com/en-us/library/6c3yckfw.aspx, Retrieved on: Apr. 3, 2017, NA pages.

"CRM for Dynamics 365 Top 10 New Features", dynamics-365-top-10-new-features, Published on: Jan. 5, 2017, 8 pages.

* cited by examiner

1000

DETERMINE WHETHER A SECOND DESIGNER LAUNCH ELEMENT IS ACTUATED TO LAUNCH A SECOND DESIGNER INLINE FROM A FIRST DESIGNER
1002

UTILIZE A COMMON PORTION OF MEMORY FOR THE CONFIGURABLE COMPONENT
1004

IN RESPONSE TO A DETERMINATION THAT THE SECOND DESIGNER LAUNCH ELEMENT IS ACTUATED, CONFIGURE THE CONFIGURABLE COMPONENT FOR THE SECOND DESIGNER IN A CANVAS OF THE FIRST DESIGNER
1006

FIG. 10

EMBEDDED DESIGNER FRAMEWORK AND EMBEDDED DESIGNER IMPLEMENTATION

BACKGROUND

A designer may include, for example, an application, a web page, etc., which may be used to generate any type of information for a user. For example, a designer may include a form designer that may include a plurality of columns that display revenue for a year for a corporation. According to another example, a designer may include a chart designer that may include a pie chart display of the revenue for a year for the corporation.

BRIEF DESCRIPTION OF DRAWINGS

Features of the present disclosure are illustrated by way of example and not limited in the following figure(s), in which like numerals indicate like elements, in which:

FIG. 10 illustrates a flowchart of an example method for embedded designer implementation in accordance with an embodiment of the present disclosure.

DETAILED DESCRIPTION

Figure 1:
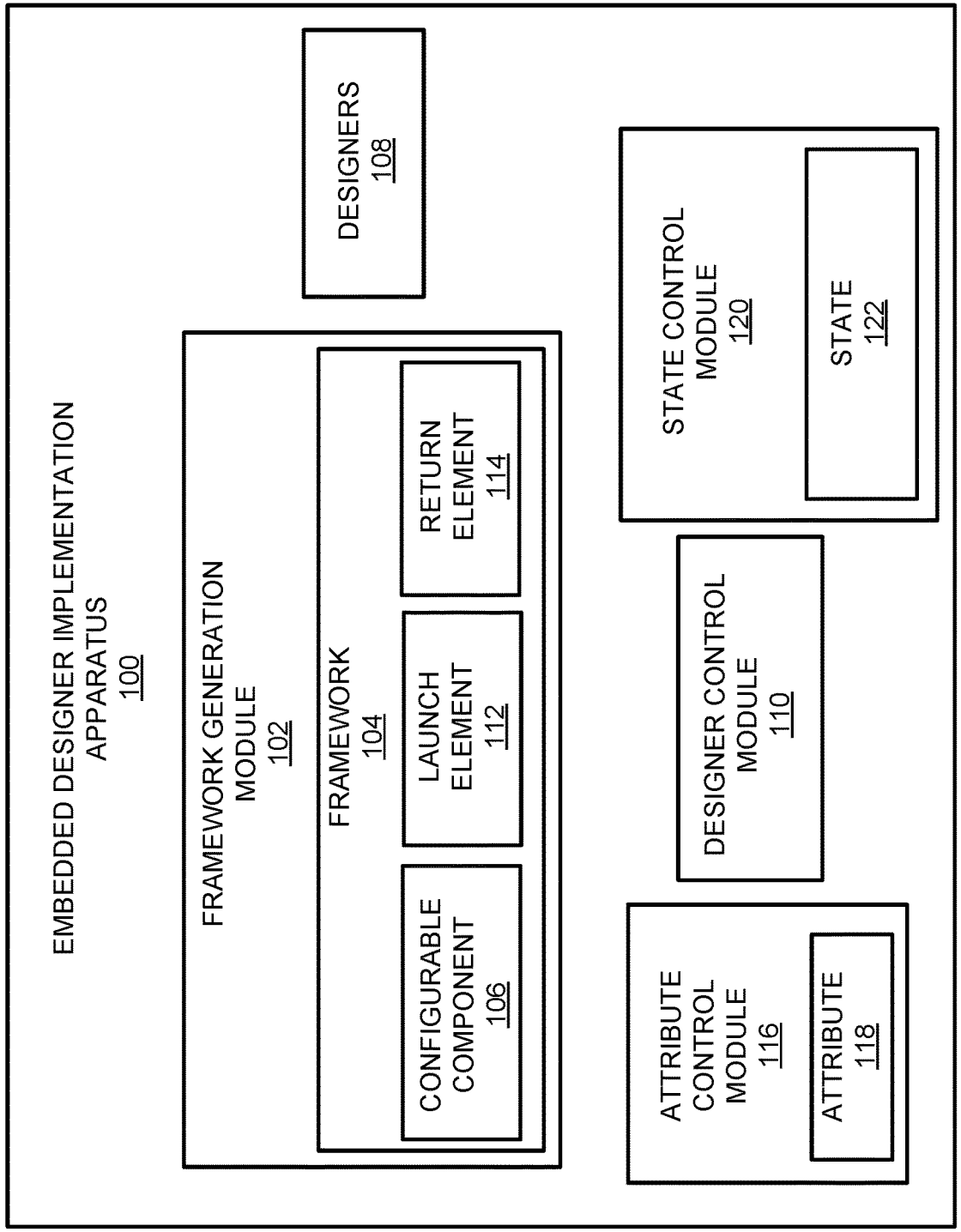
FIG. 1 illustrates a layout of an embedded designer implementation apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Embedded designer implementation apparatuses, methods for embedded designer implementation, and non-transitory computer readable media having stored thereon machine readable instructions to provide embedded designer implementation are disclosed herein. The apparatuses, methods, and non-transitory computer readable media disclosed herein provide a framework where designers may be embedded within each other and launched inline. That is, the designers may be embedded within each other and launched from within each other (e.g., inline), or return to a previous designer also from within each other (e.g., inline). The framework may represent a structure and certain controls associated with the structure to implement the embedded designers. The framework also provides for implementation of a configurable component for different designers. For example, the configurable component may include a header, a footer, a command bar, a component pane, a property pane, etc.

Designers may be implemented to operate independently. For example, designers may be implemented to launch as stand-alone applications and/or web pages in separate windows. In this regard, each designer may include its own set of components that include a header, a footer, a command bar, a component pane, a property pane, etc. Thus, each designer may utilize memory to render its own set of components. In this regard, it is technically challenging to reduce memory usage as each designer utilizes memory to render its own set of components. It is also technically challenging to reduce bandwidth consumption when different designers are launched, as each designer utilizes available bandwidth to access remote memory to render its own set of components.

In order to address at least these technical challenges with respect to memory usage and bandwidth consumption, the embedded designer implementation as disclosed herein provides a framework where designers may be embedded within each other and launched inline, and where the framework provides for implementation of configurable components for different designers. The framework also provides a canvas where each individual designer may attach. The embedding of the designers provides for reduction in memory usage as different designers may share the same memory cache used for the configurable components. Further, the embedding of the designers provides for reduction in bandwidth consumption as fewer instances of remote memory access are needed to render a designer and its configurable components.

For the configurable component that may include a header, a footer, a command bar, a component pane, a property pane, etc., a header may generally include a title for a designer, a current status of a designer artifact in the canvas, and a return element navigation link. A footer may include information such as page numbering, designer identification numbering, etc. A command bar may include a global command bar that includes an artifact title for a designer. The command bar may also provide user interface elements for invoking designer actions such as save, publish, preview, etc. The command bar may also include a contextual command bar that includes user interface elements that are specific to the designer, and provides user interface elements for adding or removing elements from the canvas. The component pane may include a list of controls and/or components that may be dragged and dropped onto a canvas. The component pane may also include user interface elements to configure the properties of the dragged elements. The property pane may include properties of the controls and/or components of the component pane. The canvas may hold all of the user interface artifacts that are to be saved and published for consumption in run time.

With respect to the framework as disclosed herein, implementation of the configurable components may provide a common pattern across different designers. For example, each designer may include a common pattern based on the configurable components. However, when a particular designer is launched, a configurable component may be specifically configured to the designer. For example, a header for a form designer may be configured based on specifics of the form designer, whereas a header for a chart designer may be configured based on specifics of the chart designer.

The framework as disclosed herein provides each designer with its own graphical design functionality. For example, each designer may include a unique header, footer, command bar, component pane, property pane, etc., which provide a graphical design functionality that is unique to the designer. Thus, each designer may exist independently, and based on the framework, each designer may be embedded within each other.

The framework as disclosed herein may also provide for a state of a designer to be saved, for example, when navigating from one page of a designer to another page of the designer, and/or when navigating from one designer to another designer. For example, a state of a designer that is used to launch another designer may be saved at the time the another designer is launched.

With respect to the framework as disclosed herein, a launch element may be used to launch a designer inline. In this regard, the launch element may include a sub-menu item, an icon, a voice command, or another type of user interface element. For example, for a first designer and a second designer, a first designer may include a second designer launch element to launch the second designer inline from the first designer upon actuation of the second designer launch element. When the second designer is launched, a state of the first designer may be saved. In this regard, the first designer may also be designated as a parent designer or a previous designer, and the second designer may also be designated as a child designer or an embedded designer.

With respect to the framework as disclosed herein, a return element may be used to return to a previous designer inline. In this regard, the return element may include a sub-menu item, an icon, a voice command, or another type of user interface element. For example, for a first designer and a second designer, the second designer may include a first designer return element to return to the first designer inline from the second designer upon actuation of the first designer return element. Upon return to the first designer, the first designer may return to a saved state, and/or a state of the first designer may be updated based on a corresponding change of a state of the second designer that affects the state of the first designer.

Implementation of the framework as disclosed herein also provides for meeting of horizontal specifications for designers. For example, horizontal specifications as disclosed herein may include performance specifications related to operations of designers, logging with respect to designers, sending/receiving of data between designers, etc.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example embedded designer implementation apparatus (hereinafter also referred to as "apparatus 100").

Referring to FIG. 1, the apparatus 100 may include a framework generation module 102 to generate a framework 104 that implements a configurable component 106. A plurality of designers 108 may include the same configurable component 106, or alternatively, each (or some) of the plurality of designers 108 may include a different configurable component 106. The designers 108 may include at least a first designer and a second designer. The configurable component 106 may include, for example, a header, a footer, a command bar, a component pane, a property pane, etc.

A designer control module 110 is to control operation of the designers 108. In this regard, a designer may include a launch element 112 to launch a further designer inline. For the example of the designers 108 including the first designer and the second designer, the designer control module 110 is to control operation of the first designer that includes a second designer launch element to launch the second designer inline from the first designer upon actuation of the second designer launch element. According to another example, the second designer may include a third designer launch element to launch a third designer inline from the second designer upon actuation of the third designer launch element. In this manner, each designer that may be used to launch a further designer may include the launch element 112 to launch a further designer inline.

According to an example, the launch element 112 may be displayed in the header of a designer to provide a visual indication, where the launch element 112 may be actuated to launch a further designer inline.

A designer may also include a return element 114 to return to a previous designer inline. For the example of the designers 108 including the first designer and the second designer, the designer control module 110 is to control operation of the second designer that includes a first designer return element to return to the first designer inline from the second designer upon actuation of the first designer return element. In this manner, each designer that has been launched inline may include the return element 114 to return to a previous designer inline.

According to an example, the return element 114 may include a visual indication of a designer being launched inline from a previous designer. For example, the return element 114 may be displayed in the header of a designer to provide a visual indication of a designer being launched inline from a previous designer. Further, the return element 114 may provide a visual indication, where the return element 114 may be actuated to return inline to a previous designer.

With respect to the framework 104, the designers 108 may utilize, based on the framework 104, a common portion of memory (e.g., memory 904 of FIG. 9 or non-transitory computer readable medium 1102 of FIG. 11) for the configurable component 106. For the example of the designers 108 including the first designer and the second designer, the first designer and the second designer may utilize, based on the framework, a common portion of the memory for the configurable component 106. In this regard, the embedding of the designers 108 provides for reduction in memory usage as different designers may share the same memory cache used for the configurable component 106. Further, the embedding of the designers 108 provides for reduction in bandwidth consumption in that fewer instances of remote memory access are needed to render a designer and its configurable component.

With respect to the framework 104 and startup of an operation using the designers 108, at start up, the framework 104 may read the configuration of the designer that is launched and render a designer shell. The designer shell may be described as a designer user interface, without the canvas component. In this regard, according to an example, the canvas may be rendered by the designer, but not by the framework 104. In addition to the above configurable components that dictate how the designer shell is rendered, the framework 104 may also provide several reusable component attributes as disclosed herein that each designer may re-use. For example, a command bar component may include common component attributes for different designers. However, a designer may also include component attributes that are unique to the designer.

The designer control module 110 may determine whether the launch element 112 is actuated. In response to a determination that the launch element 112 is actuated, the designer control module 110 may configure the configurable component 106 for the launched designer in a canvas of a previous designer (e.g., the designer that is used to launch a designer). For the example of the designers 108 including the first designer and the second designer, the designer control module 110 may determine whether the second designer launch element is actuated. Further, in response to a determination that the second designer launch element is actuated, the designer control module 110 may configure the configurable component for the second designer in a canvas of the first designer.

An attribute control module 116 is to modify an attribute 118 of the configurable component 106. For example, the attribute 118 may include a presence or absence of the configurable component 106, a position of the configurable component 106, or a dimension of the configurable component 106. For example, for a header, with respect to the presence or absence of the configurable component 106, the attribute 118 may include a presence or absence of the header. The attribute 118 may further include a behavior of the content of the configurable component 106, or a common theme that is to be used across a plurality of configurable components.

A state control module 120 is to save a state 122 of a designer upon actuation of the launch element 112. For the example of the designers 108 including the first designer and the second designer, the state control module 120 is to save a state of the first designer upon actuation of the second designer launch element.

The state control module 120 is to further restore the state of a previous designer (e.g., the designer that is used to launch a designer) upon actuation of the return element 114. For the example of the designers 108 including the first designer and the second designer, the state control module 120 is to restore the state of the first designer upon actuation of the first designer return element.

The state control module 120 is to further determine whether the return element 114 is actuated. In response to a determination that the return element 114 is actuated, the state control module 120 is to update a state of the previous designer (e.g., the designer that is used to launch a designer) based on a corresponding change of a state of the launched designer that affects the state of the previous designer. For the example of the designers 108 including the first designer and the second designer, the state control module 120 is to determine whether the first designer return element is actuated. Further, in response to a determination that the first designer return element is actuated, the state control module 120 is to update a state of the first designer based on a corresponding change of a state of the second designer that affects the state of the first designer.

Operation of the apparatus 100 is described in further detail with respect to an example of embedding of designers.

With respect to embedding of the designers 108 as disclosed herein, according to an example that includes a Designer-1 and a Designer-2, the Designer-2 may be embedded within the Designer-1 as follows.

For example, Designer-1 may include a configuration file with various configurable components defined, and Designer-2 may also include a configuration file with various configurable components defined. In order to embed Designer-2 into Designer-1, Designer-1 may include the Designer-2 configurable component configured in its canvas. In this regard, Designer-1 may include the launch element 112 that may be actuated to launch Designer-2. Assuming that Designer-1 is launched and has its configurable components rendered (e.g., header, footer, property pane, etc.), when Designer-2 is launched, the framework 104 may load the configuration of Designer-2 and replace the header, footer, property pane, etc., with what is different for Designer-2. Thus, the Designer-2 components may be configured in Designer-1 canvas. The framework 104 may recognize Designer-2 as a launchable designer and provide the launch element 112 in Designer-1. The launch element 112 may be actuated and the Designer-2 may be launched and opened inline.

When the launch element 112 is actuated, the following processes may occur with respect to the framework 104.

At the outset, the framework 104 may read the Designer-2 configuration file. The framework 104 may save a current state of Designer-1. Further, the framework 104 may replace the various configurable components in the shell (which has Designer-1 components) with the configurable components of Designer-2.

Designer-2 initialization may be invoked by providing the needed state from Designer-1 so that Designer-2 is identified as being launched inline inside Designer-1. For example, in order to launch a designer, for the canvas to be rendered, a view designer may need a view identification, a form designer may need a form identification, etc. The noted state from Designer-1 may be passed from Designer-1 to Designer-2. For example, in an application designer, there may be multiple forms that may be added to an application, and each form may be edited inline. Thus, when the first form is edited, the same process may be followed, but the first form may be passed as a state. Further, when the second form is completed, the processes described above with respect to Designer-1 and Designer-2 may be performed, but now the second form may be passed as a state.

Upon actuation of the launch element 112, the return element 114 may be added, for example, at the top of the Designer-2 to provide a visual cue that a user is in Designer-2 inside Designer-1. Upon completion of the initialization of Designer-2, a user may perform tasks in Designer-2.

After completion of use of the Designer-2, the return element 114 may be actuated to return to Designer-1. In this regard, the framework 104 may determine whether any changes have been made to Designer-2, and whether the changes have been saved. Thus, any unsaved changes may be lost, and the framework 104 may provide a confirmation message of any unsaved changes. If the return element 114 is actuated to return to Designer-1, the framework 104 may retrieve the previously stored state of Designer-1. The framework 104 may replace the configurable components of the shell with Designer-1 components. Further, the framework 104 may initialize Designer-1 with the saved designer state.

The framework 104 may further update Designer-1 to reflect any state changes from Designer-2. For example, according to an example, Designer-2 may be embedded within Designer-1 because Designer-1 may need information from Designer-2. For example, assuming that Designer-1 is an application designer, and Designer-2 is a form designer, initially, the form designer may not be configured (e.g., the form associated with the form designer is in different state). Assuming that when the application designer is launched, the form associated with the form designer is in state A, in the form designer, the state of the form may be changed (e.g., from state A to state B). When returning to Designer-1, the form should show a form state B (where the previously saved state of the form was in state A). Thus, upon returning to Designer-1, the state of Designer-1 may be restored, and Designer-1 may be updated to reflect any state changes that occurred in Designer-2 (e.g., form state A updated to state B). The framework 104 may also update the return element 114 to reflect the current navigation state.

Accordingly, the example of the steps disclosed above may be performed with respect to embedding of the designers 108 (e.g., for a Designer-1 and a Designer-2).

Referring again to FIG. 1, with respect to horizontal specifications, the framework 104 may account for various horizontal specifications for the designers 108. The horizontal specifications may include, for example, telemetry and tracing, localization and Right to Left (RTL) support, accessibility, performance, caching, and scheduling network calls.

With respect to telemetry and tracing, for telemetry, the framework 104 may provide the needed data models and libraries for sending telemetry information to insights endpoint. The framework 104 may manage the operational telemetry needs of all of the designers 108 such as a designer launch event, performance marker events, errors, etc. With respect to tracing, the framework 104 may provide the ability for designers and other framework elements to trace their call patterns for telemetry and debugging. The framework 104 may provide different trace levels and pluggable trace printers to forward trace output to a console and/or a file.

With respect to localization and RTL support, the framework 104 may provide the guidelines for bidirectional support for a designer application. The framework 104 may also inject the needed RTL elements onto an application as part of a designer orchestration process.

With respect to accessibility, the framework 104 may provide directives and controls that various designers may use to provide accessibility features. The framework 104 may also recommend proper usage of HyperText Markup Language (HTML) artifacts to be accessibility compliant.

With respect to performance, the framework 104 may provide key performance indicators for designer scenarios, the ability for designers for start and stop performance markers, a visualization for key performance indicators and performance markers, and authoring of performance test cases and management of test runs.

With respect to caching, the framework 104 may provide caching of metadata obtained from a server locally on a browser session. An interface layer may use caching internally to return data faster to a caller. An Application Programming Interface (API) call may be configurable with respect to caching behavior based on the caching strategy. For example, the strategies may include local, local and remote, and remote. For local, data may be returned from the cache. For local and remote, data may be returned from the cache, but a background asynchronous call may be made to pre-fetch updated data. For remote, the backend may be accessed to fetch data.

With respect to scheduling network calls, the framework 104 may provide for implementation of background and on demand calls to the backend to get and update data. The framework 104 may also provide a priorities job queue to execute high priority jobs sooner, and retry failed jobs with a configured threshold.

Figure 2:
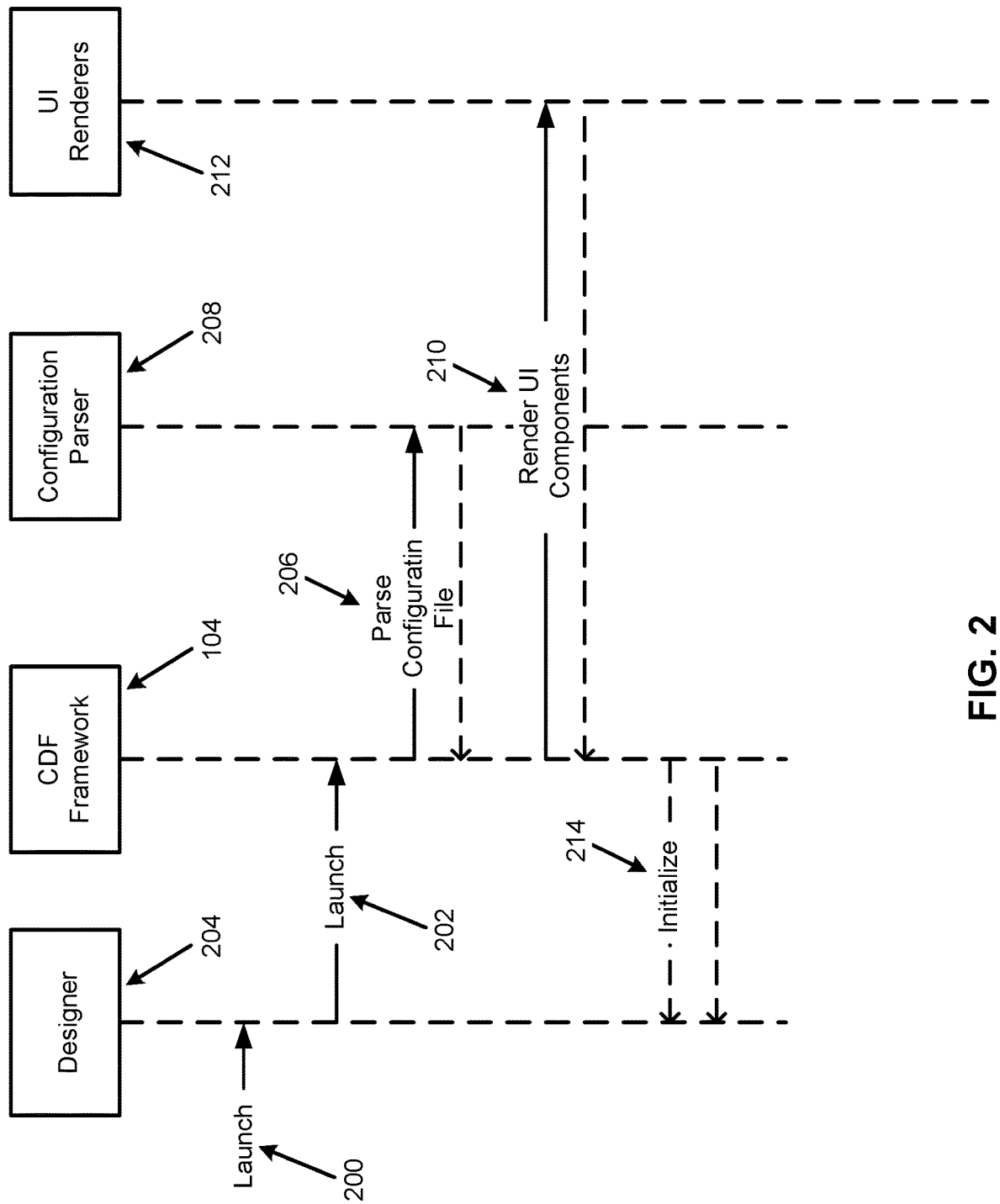
FIG. 2 illustrates a launch sequence to illustrate operation of the embedded designer implementation apparatus of FIG. 1 in accordance with an embodiment of the present disclosure.

FIG. 2 illustrates a launch sequence to illustrate operation of the apparatus 100 in accordance with an embodiment of the present disclosure.

Referring to FIG. 2, at 200, a designer launch sequence may be initiated at 202 to launch the designer at 204.

At 206, the framework 104 may parse a designer configuration file for the designer at 204, for example, by using a configuration parser at 208.

At 210, the framework 104 may render user interface components (e.g., the configurable components) of the designer, for example, by using a user interface renderer at 212. For example, the framework 104 may render the header, the footer, the command bar, the component pane, the property pane, etc.

Initialization of the designer at 204 may be performed by the framework 104 at 214. In this regard, initialization of the designer at 204 may be invoked by providing the needed state of the designer at 204.

With respect to the designer launch sequence, once a designer has defined the configuration file, the framework 104 may read the configuration attributes (e.g., a plurality of the attributes 118) defined for the designer. The framework 104 may render a designer based on the configuration attributes to thus provide a consistent look and feel across different designers. Additionally, any user interface updates may be performed at the framework 104 and further applied to all designers.

Figure 3:
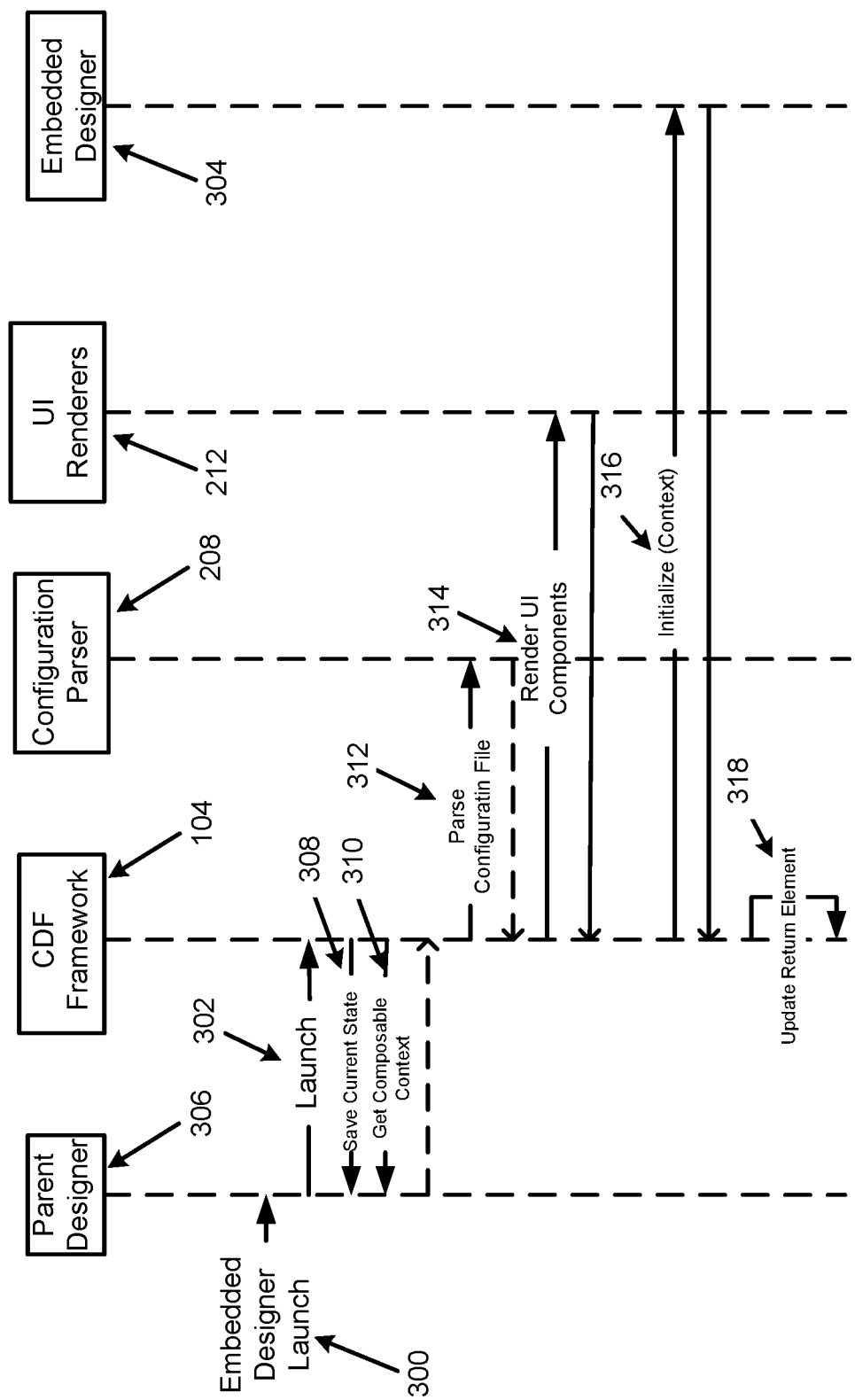
FIG. 3 illustrates a forward navigation sequence to illustrate operation of the embedded designer implementation apparatus of FIG. 1 in accordance with an embodiment of the present disclosure.

FIG. 3 illustrates a forward navigation sequence to illustrate operation of the apparatus 100 in accordance with an embodiment of the present disclosure.

Referring to FIG. 3, at 300, an embedded designer launch sequence may be initiated at 302 where an embedded designer 304 may be launched from a parent designer 306. In this regard, the parent designer 306 may call the framework 104 to launch the embedded designer 304.

At 308, the framework 104 may save a current state of the parent designer, and at 310, the framework 104 may obtain a composable context (e.g., a context of the configurable component 106) for the parent designer 306.

At 312, the framework 104 may parse the embedded designer configuration file, for example, by using the configuration parser at 208. Further, at 314, the framework 104 may also render the user interface components (e.g., the configurable components) of the embedded designer, for example, by using the user interface renderer at 212.

A different user interface renderer at 212 may be provided for each of the user interface components (e.g., for the header, the footer, the command bar, etc.). For example, a header user interface renderer may be provided the header, a footer user interface renderer may be provided the footer, etc.

The framework 104 may include the configuration parser at 208 and the user interface renderer at 212. However, the configuration parser at 208 and the user interface renderer at 212 are illustrated as separate features in the example of FIG. 3.

At 316, the framework 104 may initialize the embedded designer 304. Initialization of the embedded designer 304 may be invoked by providing the needed state to the embedded designer 304.

At 318, the framework 104 may update the return element 114 associated with the embedded designer 304. In this regard, the update of the return element 114 may include an indication of the parent designer 306, where actuation of the return element 114 may commence a backward navigation sequence as disclosed herein.

Figure 4:
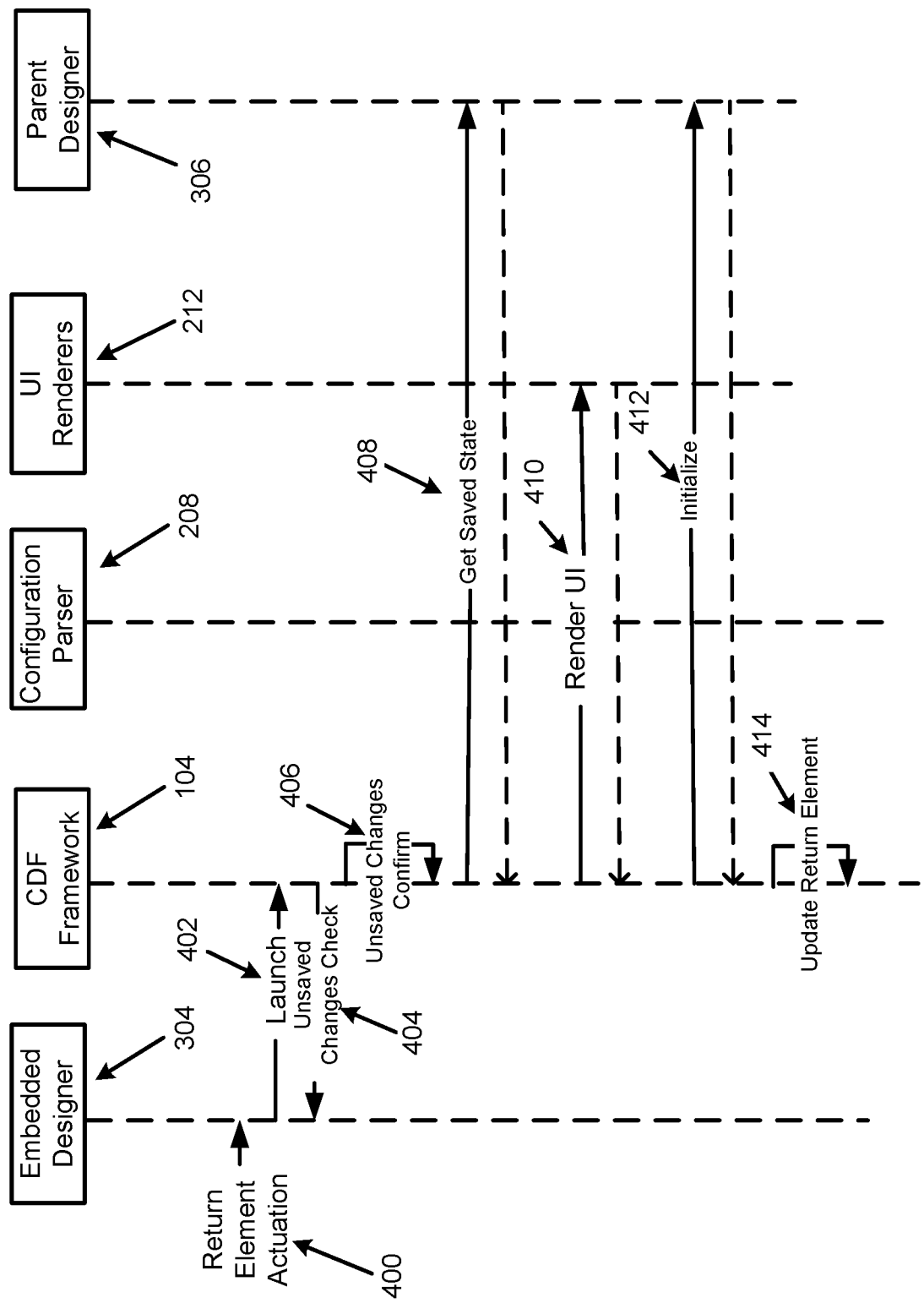
FIG. 4 illustrates a backward navigation sequence to illustrate operation of the embedded designer implementation apparatus of FIG. 1 in accordance with an embodiment of the present disclosure.

FIG. 4 illustrates a backward navigation sequence to illustrate operation of the apparatus 100 in accordance with an embodiment of the present disclosure.

Referring to FIG. 4, at 400, a parent designer return sequence may be initiated at 402 where the embedded designer 304 may be used to return to the parent designer 306. In this regard, the embedded designer 304 may call the framework 104 to return to the parent designer 306.

At 404, the framework 104 may determine whether the embedded designer 304 includes any unsaved changes.

At 406, the framework 104 may confirm whether any unsaved changes are to be saved, before proceeding with further processing to return to the parent designer 306.

At 408, the framework 104 may obtain the saved state of the parent designer 306.

At 410, the framework 104 may render the user interface components (e.g., the configurable components) of the embedded designer, for example, by using the user interface renderer at 212.

At 412, the framework 104 may initialize the embedded designer 304. Initialization of the embedded designer 304 may be invoked by providing the needed state to the embedded designer 304.

At 414, the framework 104 may update the return element 114 associated with the embedded designer 304. In this regard, the update of the return element 114 may include an indication of a return to the parent designer 306.

Figure 5:
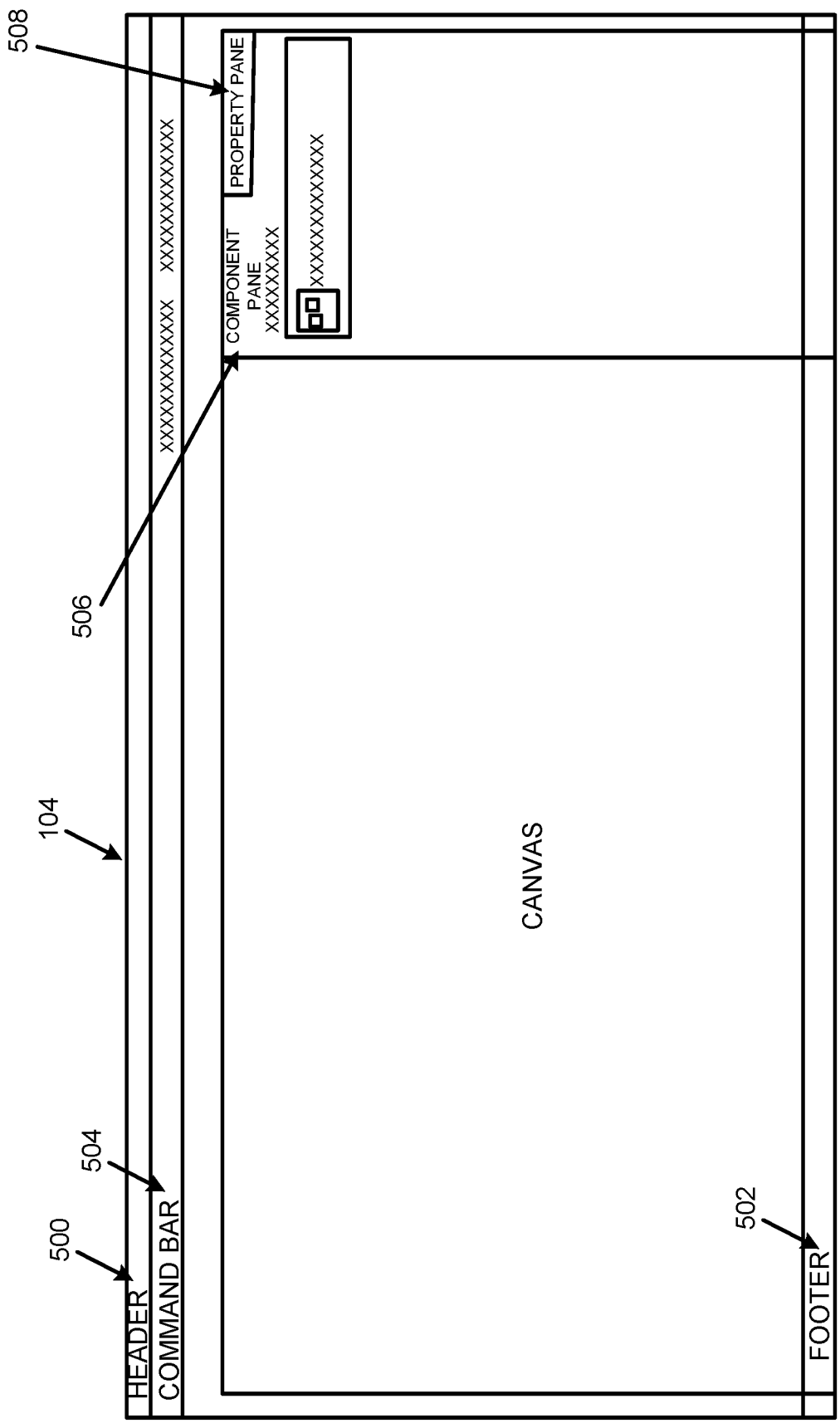
FIG. 5 illustrates a framework to illustrate operation of the embedded designer implementation apparatus of FIG. 1 in accordance with an embodiment of the present disclosure.

FIG. 5 illustrates a framework to illustrate operation of the embedded designer implementation apparatus of FIG. 1 in accordance with an embodiment of the present disclosure.

Referring to FIG. 5, the framework 104 may include a header 500, a footer 502, a command bar 504, a component pane 506, a property pane 508, a canvas 508, etc. As disclosed herein, the framework 104 may represent a structure and certain controls associated with the structure to implement the embedded designers.

Figure 6:
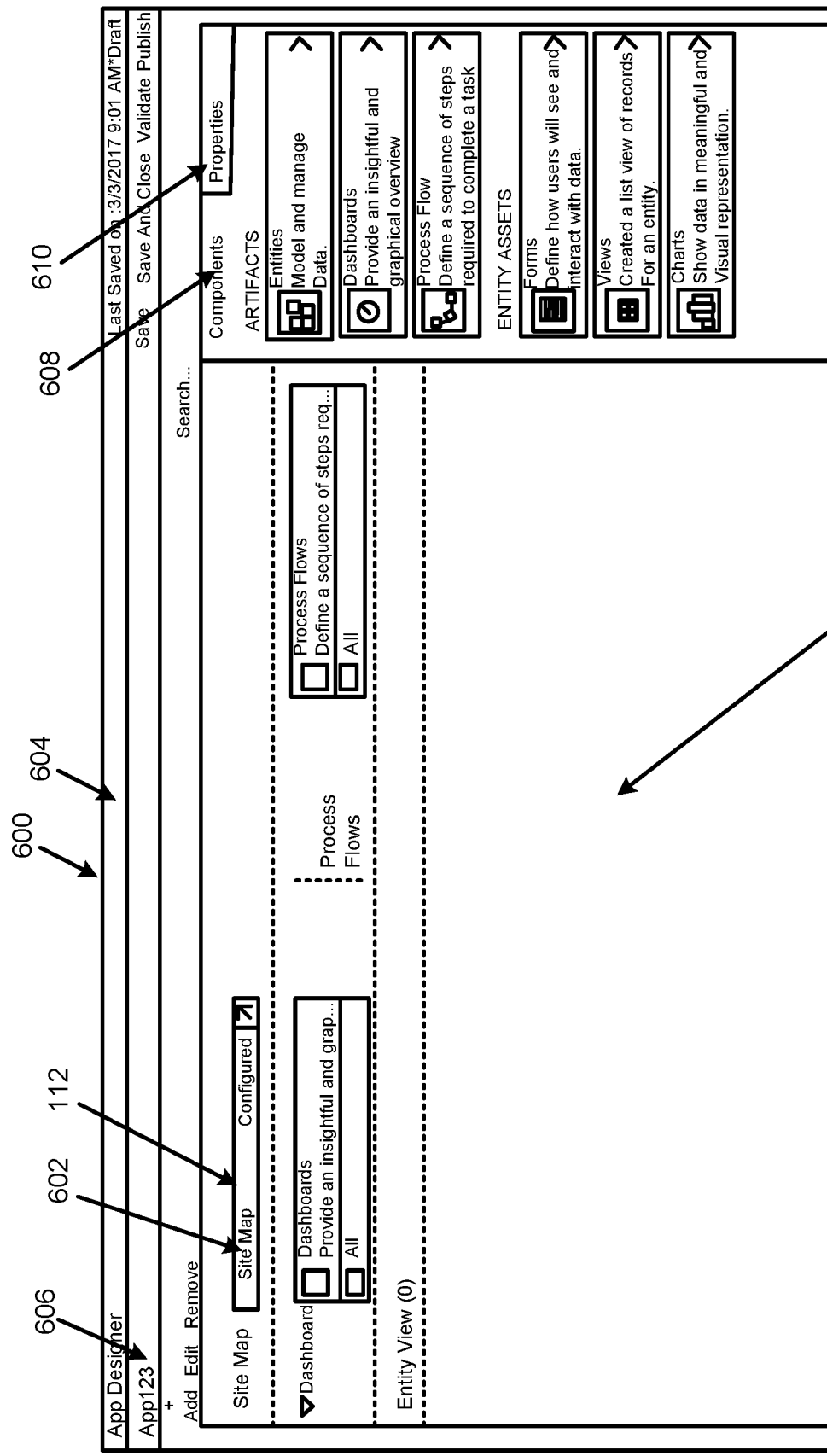
FIG. 6 illustrates an application designer including an embedded site map designer to illustrate operation of the embedded designer implementation apparatus of FIG. 1 in accordance with an embodiment of the present disclosure.

FIG. 6 illustrates an application designer including an embedded site map designer to illustrate operation of the apparatus 100 in accordance with an embodiment of the present disclosure.

Referring to FIG. 6, an application designer 600 including an embedded site map designer 602 is illustrated. In this regard, the launch element 112 may be used to launch the site map designer 602. The application designer 600 may include configurable components including a header at 604, a command bar at 606, a component pane at 608, and a property pane at 610. Further, the application designer 600 may include a canvas at 612.

Figure 7:
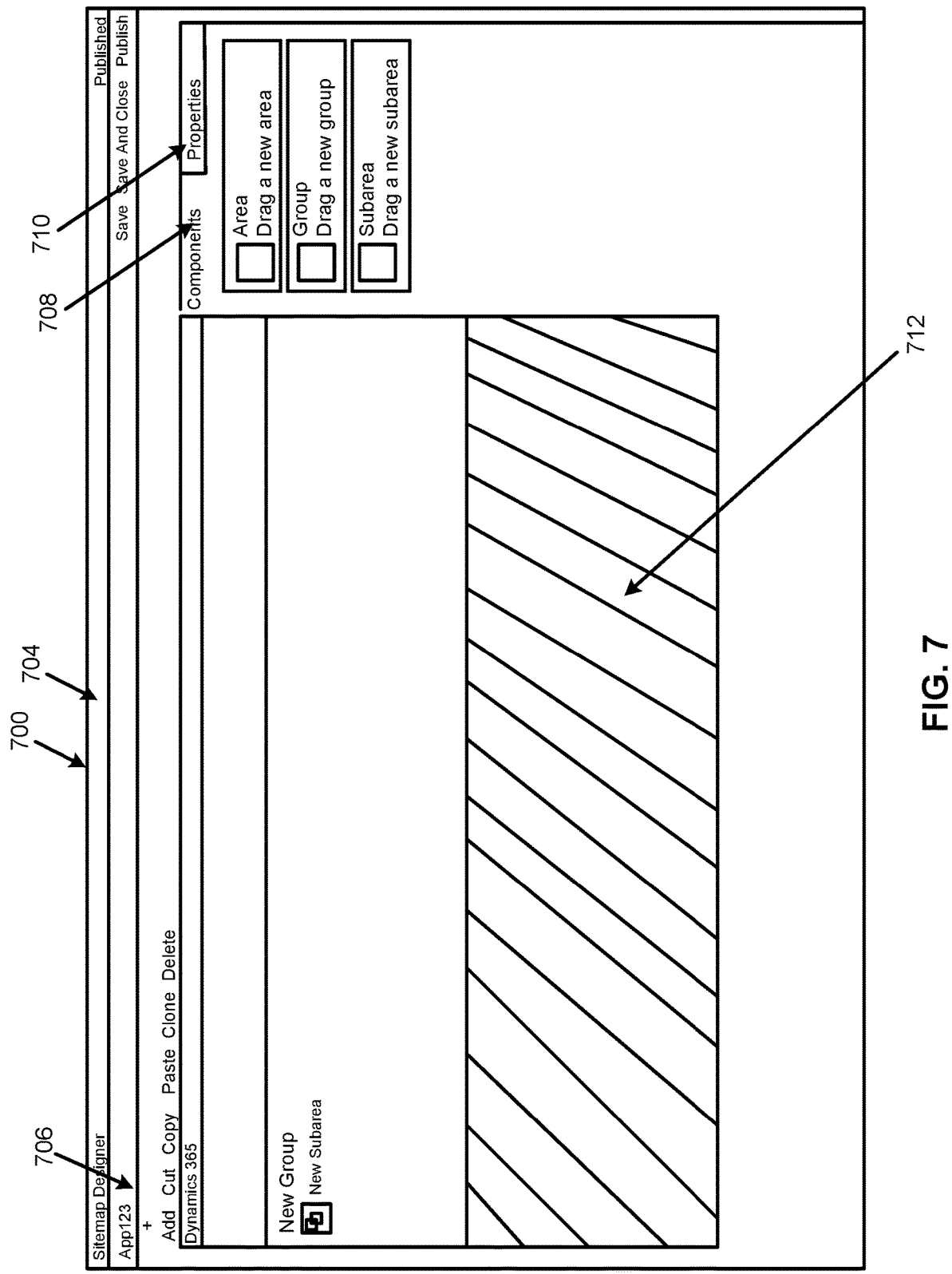
FIG. 7 illustrates a stand-alone site map designer to illustrate operation of the embedded designer implementation apparatus of FIG. 1 in accordance with an embodiment of the present disclosure.

FIG. 7 illustrates a stand-alone site map designer to illustrate operation of the apparatus 100 in accordance with an embodiment of the present disclosure.

Referring to FIG. 7, the stand-alone site map designer 700 may represent a designer that is not embedded, for example, in the application designer 600 of FIG. 6. The stand-alone site map designer 700 may include a header at 704, a command bar at 706, a component pane at 708, and a property pane at 710. Further, the stand-alone site map designer 700 may include a canvas at 712.

Figure 8:
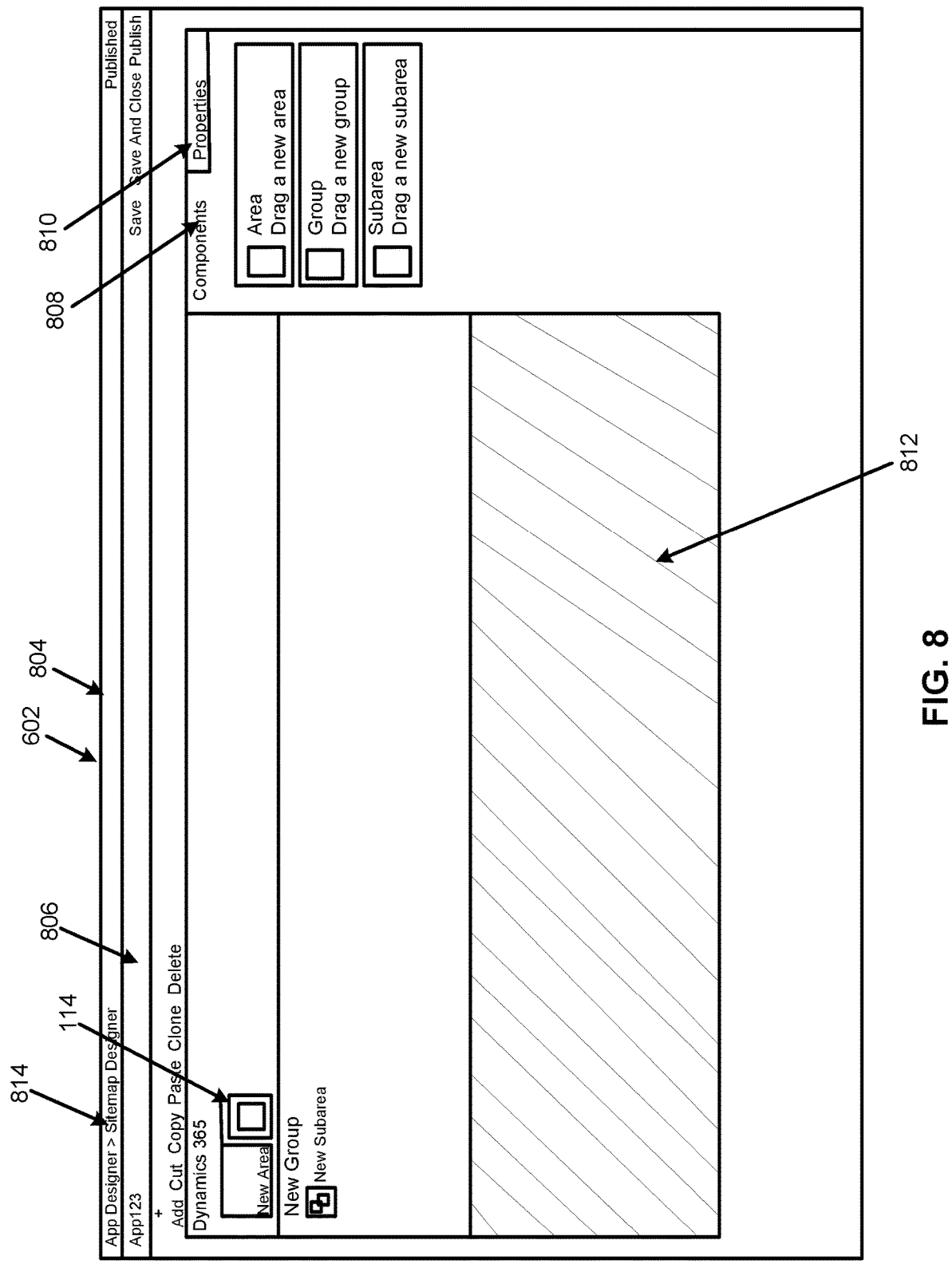
FIG. 8 illustrates a site map designer launched inline from the application designer of FIG. 6 to illustrate operation of the embedded designer implementation apparatus of FIG. 1 in accordance with an embodiment of the present disclosure.

FIG. 8 illustrates a site map designer launched inline from the application designer of FIG. 6 to illustrate operation of the apparatus 100 in accordance with an embodiment of the present disclosure.

Referring to FIG. 8, the site map designer 602 may represent the embedded designer that is launched inline upon actuation of the launch element 112 of FIG. 6. In this regard, the site map designer 602 may include the return element 114, and configurable components including a header at 804, a command bar at 806, a component pane at 808, and a property pane at 810. Further, the site map designer 602 may include a canvas at 812. Further, as noted at 814, the site map designer 602 may include an indication that the site map designer 602 is launched inline from the application designer 600.

Figure 9:
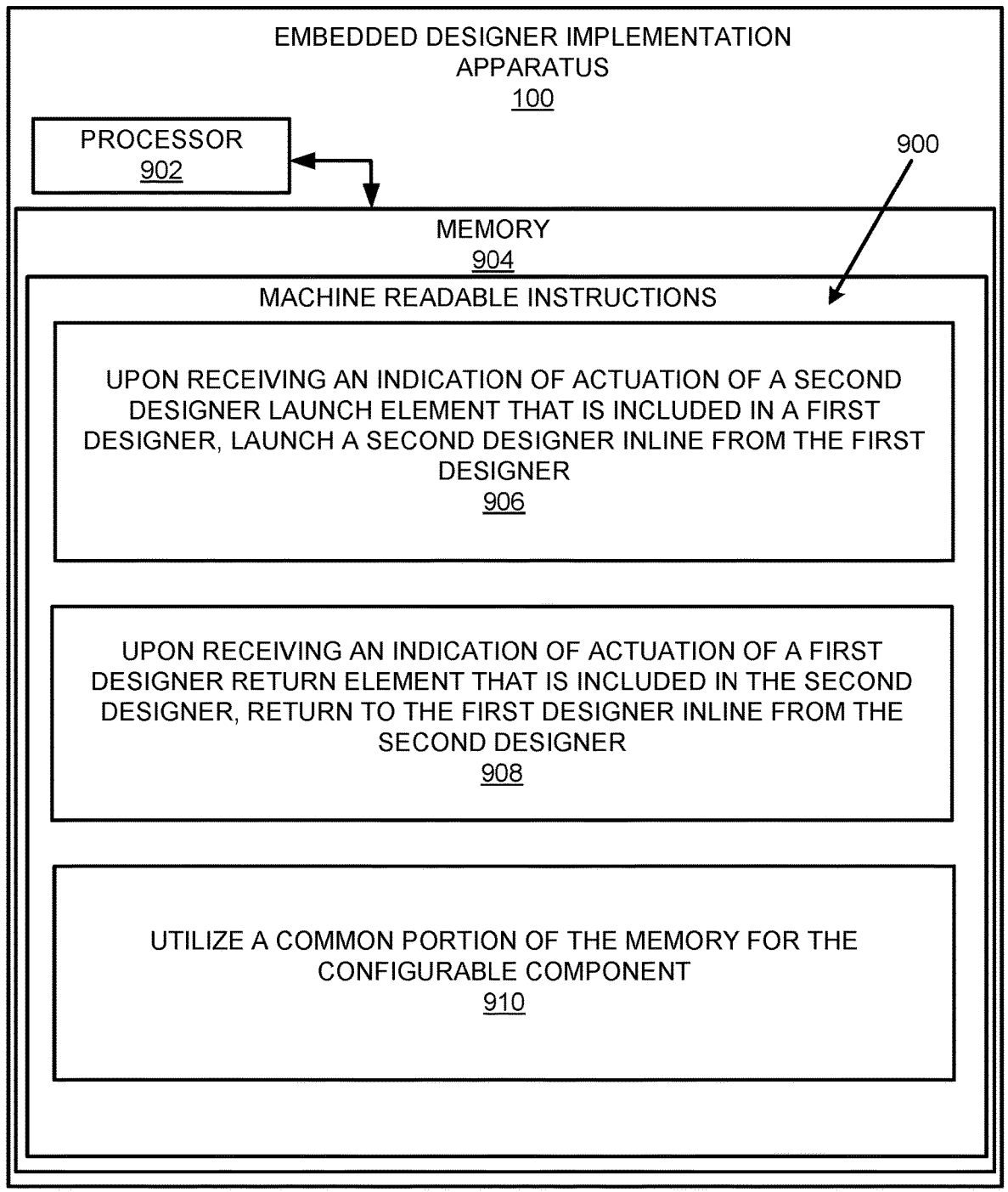
FIG. 9 illustrates an example block diagram for embedded designer implementation in accordance with an embodiment of the present disclosure.
Figure 11:
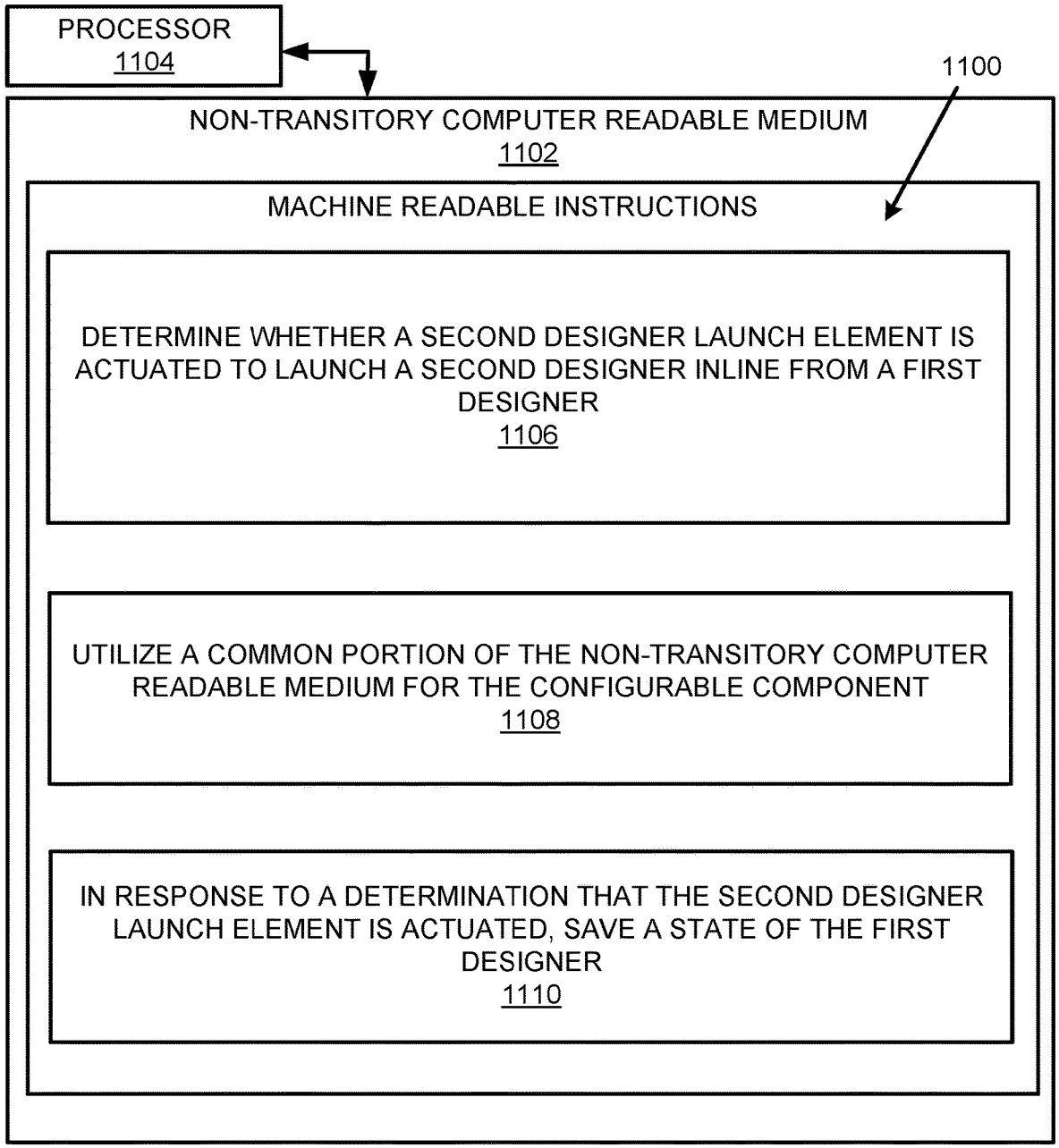
FIG. 11 illustrates a further example block diagram for embedded designer implementation in accordance with another embodiment of the present disclosure.

FIGS. 8-10 respectively illustrate an example block diagram 900, a flowchart of an example method 1000, and a further example block diagram 1100 for embedded designer implementation, according to examples. The block diagram 900, the method 1000, and the block diagram 1100 may be implemented on the apparatus 100 described above with reference to FIG. 1 by way of example and not of limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent an example method for embedded designer implementation, and the steps of the method. FIG. 11 may represent a non-transitory computer readable medium 1102 having stored thereon machine readable instructions to provide embedded designer implementation according to an example. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to, upon receiving an indication of actuation of a second designer launch element (e.g., the launch element 112) that is included in a first designer, launch a second designer inline from the first designer.

The processor 902 may fetch, decode, and execute the instructions 908 to, upon receiving an indication of actuation of a first designer return element (e.g., the return element 114) that is included in the second designer, return to the first designer inline from the second designer. The first designer and the second designer may include a configurable component.

The processor 902 may fetch, decode, and execute the instructions 910 to utilize a common portion of the memory for the configurable component.

Referring to FIGS. 1-8 and 10, and particularly FIG. 10, for the method 1000, at block 1002, the method may include determining whether a second designer launch element (e.g., the launch element 112) is actuated to launch a second designer inline from a first designer. In this regard, the first designer may include the second designer launch element, the second designer may include a first designer return element (e.g., the return element 114) to return to the first designer inline from the second designer upon receiving an indication of actuation of the first designer return element, and the first designer and the second designer may include a configurable component.

At block 1004, the method may include utilizing a common portion of memory for the configurable component.

At block 1006, the method may include, in response to a determination that the second designer launch element is actuated, configuring, the configurable component 106 for the second designer in a canvas of the first designer.

Referring to FIGS. 1-8 and 11, and particularly FIG. 11, for the block diagram 1100, the non-transitory computer readable medium 1102 may include instructions 1106 to determine whether a second designer launch element (e.g., the launch element 112) is actuated to launch a second designer inline from a first designer. In this regard, the first designer may include the second designer launch element, the second designer may include a first designer return element (e.g., the return element 114) to return to the first designer inline from the second designer upon receiving an indication of actuation of the first designer return element, and the first designer and the second designer may include a configurable component.

The processor 1104 may fetch, decode, and execute the instructions 1108 to utilize a common portion of non-transitory computer readable medium for the configurable component.

The processor 1104 may fetch, decode, and execute the instructions 1110 to, in response to a determination that the second designer launch element is actuated, save the state 122 of the first designer.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a memory storing machine readable instructions that when executed by the processor cause the processor to:
      upon receiving an indication of actuation of a second designer launch element that is included in a first designer, launch a second designer inline from the first designer, wherein the first designer and the second designer include a configurable component, wherein the configurable component includes a header, a footer, a command bar, a component pane, or a property pane;
      in response to a determination that the second designer launch element is actuated, configure the configurable component for the second designer in a canvas of the first designer;
      upon receiving an indication of actuation of a first designer return element that is included in the second designer, return to the first designer inline from the second designer; and
      utilize a common portion of the memory for the configurable component.

2. The apparatus according to claim 1, wherein the configurable component for the first designer includes a different configuration compared the configurable component for the second designer.

3. The apparatus according to claim 1, wherein the configurable component for the first designer includes a same configuration as the configurable component for the second designer.

4. The apparatus according to claim 1, wherein the instructions are further to cause the processor to:
   upon receiving an indication of actuation of a third designer launch element included in the second designer, launch a third designer inline from the second designer.

5. The apparatus according to claim 1, wherein the first designer return element includes a visual indication of the second designer being launched inline from the first designer.

6. The apparatus according to claim 1, wherein the instructions are further to cause the processor to:
   save a state of the first designer upon receiving the indication of actuation of the second designer launch element; and
   restore the state of the first designer upon receiving the indication of actuation of the first designer return element.

7. The apparatus according to claim 1, wherein the instructions are further to cause the processor to:
   modify an attribute of the configurable component, wherein the attribute includes
      a presence or absence of the configurable component,
      a position of the configurable component, or
      a dimension of the configurable component.

8. The apparatus according to claim 1, wherein the instructions are further to cause the processor to:
   determine whether the first designer return element is actuated; and in response to a determination that the first designer return element is actuated, update a state of the first designer based on a corresponding change of a state of the second designer that affects the state of the first designer.

9. The apparatus according to claim 1, wherein the instructions are further to cause the processor to:
determine whether the second designer launch element is actuated; and
in response to a determination that the second designer launch element is actuated, replace the configurable component of the first designer with the configurable component of second designer in the canvas of the first designer.

10. The apparatus according to claim 1, wherein the instructions are further to cause the processor to:
determine whether the second designer launch element is actuated; and
in response to a determination that the second designer launch element is actuated, add the first designer return element to the second designer.

11. The apparatus according to claim 1,
wherein the instructions to launch the second designer inline from the first designer are further to cause the processor to:
embed the second designer within the first designer; and
wherein the instructions to return to the first designer inline from the second designer are further to cause the processor to:
obtain, based on the embedding of the second designer within the first designer, information from the second designer for use with the first designer.

12. A method performed by a processor, the method comprising:
determining whether a second designer launch element is actuated to launch a second designer inline from a first designer, wherein
the first designer includes the second designer launch element,
the second designer includes a first designer return element to return to the first designer inline from the second designer upon receiving an indication of actuation of the first designer return element, and
the first designer and the second designer include a configurable component, wherein the configurable component includes a header, a footer, a command bar, a component pane, or a property pane;
utilizing a common portion of memory for the configurable component; and
in response to a determination that the second designer launch element is actuated, configuring the configurable component for the second designer in a canvas of the first designer.

13. The method according to claim 12, wherein the first designer return element includes a visual indication of the second designer being launched inline from the first designer.

14. A non-transitory computer readable medium having stored thereon machine readable instructions, the machine readable instructions, when executed by a processor, cause the processor to:
determine whether a second designer launch element is actuated to launch a second designer inline from a first designer, wherein
the first designer includes the second designer launch element,
the second designer includes a first designer return element to return to the first designer inline from the second designer upon receiving an indication of actuation of the first designer return element, and
the first designer and the second designer include a configurable component, wherein the configurable component includes a header, a footer, a command bar, a component pane, or a property pane;
utilize a common portion of the non-transitory computer readable medium for the configurable component; and
in response to a determination that the second designer launch element is actuated,
configure the configurable component for the second designer in a canvas of the first designer, and
save a state of the first designer.

15. The non-transitory computer readable medium according to claim 14, wherein the instructions are further to cause the processor to:
restore the state of the first designer upon receiving an indication of actuation of the first designer return element.

16. The non-transitory computer readable medium according to claim 14, wherein the instructions are further to cause the processor to:
determine whether the first designer return element is actuated; and
in response to a determination that the first designer return element is actuated, update the state of the first designer based on a corresponding change of a state of the second designer that affects the state of the first designer.

17. The non-transitory computer readable medium according to claim 14, wherein the instructions are further to cause the processor to:
modify an attribute of the configurable component, wherein the attribute includes
a presence or absence of the configurable component,
a position of the configurable component, or
a dimension of the configurable component.

18. The non-transitory computer readable medium according to claim 14, wherein the instructions are further to cause the processor to:
upon receiving an indication of actuation of a third designer launch element included in the second designer, launch a third designer inline from the second designer.

* * * * *